United States Patent
Sitaram et al.

(10) Patent No.: US 12,063,712 B2
(45) Date of Patent: Aug. 13, 2024

(54) WIFI DEVICE COMPATIBILITY ANALYZER FOR SATELLITE NETWORKS

(71) Applicant: HUGHES NETWORK SYSTEMS, LLC, Germantown, MD (US)

(72) Inventors: Shivaram Sitaram, Germantown, MD (US); Rajeev Kubba, Germantown, MD (US); Ying Wang, Germantown, MD (US); Junyu Gong, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 181 days.

(21) Appl. No.: 17/548,309

(22) Filed: Dec. 10, 2021

(65) Prior Publication Data

US 2022/0191684 A1 Jun. 16, 2022

Related U.S. Application Data

(60) Provisional application No. 63/124,017, filed on Dec. 10, 2020.

(51) Int. Cl.

| | |
|---|---|
| *H04W 24/10* | (2009.01) |
| *H04B 7/155* | (2006.01) |
| *H04B 7/185* | (2006.01) |
| *H04L 41/16* | (2022.01) |
| *H04W 8/00* | (2009.01) |

(Continued)

(52) U.S. Cl.
CPC .......... *H04W 8/22* (2013.01); *H04B 7/18519* (2013.01); *H04L 41/16* (2013.01); *H04W 8/005* (2013.01); *H04W 24/02* (2013.01); *H04W 24/10* (2013.01)

(58) Field of Classification Search
CPC ........ H04B 7/00; H04B 7/18519; H04B 7/15; H04B 7/155; H04B 7/185; H04B 7/18532; H04W 8/005; H04W 8/22; H04W 24/10; H04L 41/16
See application file for complete search history.

(56) References Cited

U.S. PATENT DOCUMENTS

| | | | |
|---|---|---|---|
| 2018/0197111 A1 | 7/2018 | Crabtree et al. | |
| 2019/0110211 A1* | 4/2019 | Jain | H04W 24/02 |
| 2019/0141543 A1* | 5/2019 | Ganapathi | H04W 24/08 |

(Continued)

OTHER PUBLICATIONS

International Search Report and Written Opinion issued in Application No. PCT/US2021/062947, dated Mar. 25, 2022.

*Primary Examiner* — Blane J Jackson
(74) *Attorney, Agent, or Firm* — Potomac Technology Law, LLC

(57) ABSTRACT

A system and method for identifying devices with WiFi connection incompatibility are described. Data related to connectivity for at least one customer premise equipment (CPE) connected to each terminal in a satellite network is collected in order to generate a set of metrics associated with each of the at least CPE using the collected data. A first set of results indicative of network incompatibility is determined for each of the CPEs. Next, a second set of results indicative of network incompatibility is determined for each CPE using at least one machine learning algorithm. Information indicative of network incompatibility is subsequently generated for each CPE based on the first set of results and the second set of results.

20 Claims, 10 Drawing Sheets

(51) Int. Cl.
*H04W 8/22* (2009.01)
*H04W 24/02* (2009.01)

(56) References Cited

U.S. PATENT DOCUMENTS

2019/0391800 A1  12/2019  Lin et al.
2020/0322228 A1  10/2020  Ingah

* cited by examiner

WIFI DEVICE COMPATIBILITY ANALYZER FOR SATELLITE NETWORKS

CROSS-REFERENCE TO RELATED APPLICATION

The present application claims priority to U.S. Provisional Patent Application No. 63/124,017 filed Dec. 10, 2020, and entitled "WIFI DEVICE COMPATIBILITY ANALYZER FOR SATELLITE NETWORKS", the entire disclosure of which is incorporated herein by reference.

BACKGROUND INFORMATION

High-speed internet services are increasingly used for accessing different types of content. Consumers utilize such services to access content such as news, social media, videos, movies, music, etc. Consumers residing in rural areas are often unable to access high-speed internet services from traditional internet service providers (ISPs) such as telephone companies, cable companies, etc. This can occur, for example, due to a lack of infrastructure for delivering high-speed internet services. Satellite networks can be used to provide reliable high-speed internet services to a large number of customers, such as those in rural areas, who would otherwise have no connectivity.

Consumers often utilize a variety of devices which establish wireless connections (i.e., WiFi) in a home network to access internet services and content through a wide area network, such as a satellite network. These devices can include, for example, mobile phones, tablets, laptops, internet of things (IoT) devices, etc. In many cases, the complexities of connecting these devices through several individual networks can lead to issues with the quality of service (or QoS) or the consumer's quality of experience. Inevitably, the satellite ISP is contacted to resolve the issues and improve the experience. It remains a challenging task for satellite ISPs to gain required insights into consumer experience issues using WiFi devices over satellite networks that support internet protocol (IP) data traffic. These insights are essential for the satellite ISP to develop recommendations on optimized home network setup and adapt and fine-tune network configuration, including the devices used by the consumers, to enhance the QoS as well as the quality of experience for the consumers.

Based on the foregoing, there is a need for an approach to analyze device WiFi device compatibility in a satellite network based on operational parameters associated with satellite network connectivity.

BRIEF SUMMARY

A method and system for analyzing WiFi device compatibility are disclosed. According to an embodiment, the method includes collecting data related to connectivity for at least one customer premise equipment (CPE) connected to each terminal in a satellite network; generating a set of metrics associated with each of the at least CPE using the collected data, the set of metrics representing combinations of portions of the collected data evaluated against one or more criteria associated with incompatibility in the satellite network; determining a first set of results, the first set of results indicating network incompatibility for each of the at least one CPE connected to each terminal after applying at least one statistical method to a first portion of the generated set of metrics; determining a second set of results, the second set of results indicating network incompatibility for each of the at least one CPE connected to each terminal after applying at least one machine learning algorithm to a second portion of the generated set of metrics; and generating information indicative of network incompatibility for each of the least one CPE based on the first set of results and the second set of results.

According to an embodiment, the system includes a gateway of a satellite network; one or more terminals configured to establish a communication link with the gateway via at least one satellite; and at least one CPE connected to each of the one or more terminals. Each of the one or more terminals is configured to facilitate network connectivity for the at least one CPE over the satellite network. The gateway is configured to: collect data related to connectivity for the at least one CPE connected to each terminal in a satellite network, generate a set of metrics associated with each of the at least CPE connected to each terminal using the collected data, the set of metrics representing combinations of portions of the collected data evaluated against one or criteria associated with incompatibility in the satellite network, determine a first set of results, the first set of results indicating network incompatibility for each of the at least one CPE connected to each terminal after applying at least one statistical method to a first portion of the generated set of metrics, determine a second set of results, the second set of results indicating network incompatibility for each of the at least one CPE connected to each terminal after applying at least one machine learning algorithm to a second portion of the generated set of metrics, and generate information indicative of network incompatibility for each of the least one CPE based on the first set of results and the second set of results.

The system further includes one or more terminals configured to establish a communication link with the gateway via at least one satellite and at least one CPE connected to each of the one or more terminals. Each of the one or more terminals is configured to facilitate network connectivity for at least one CPE over the satellite network. The gateway is configured to collect data related to connectivity for the at least one CPE connected to each terminal in a satellite network and generate a set of metrics associated with each of the at least one CPE connected to each terminal connected to each terminal using the collected data, the set of metrics representing combinations of portions of the collected data evaluated against one or criteria associated with incompatibility in the satellite network The gateway is further configured to determine a first set of results, the first set of results indicating network incompatibility for each of the at least one CPE connected to each terminal after applying at least one statistical method to a first portion of the generated set of metrics, determine a second set of results, the second set of results indicating network incompatibility for each of the at least one CPE connected to each terminal after applying at least one machine learning algorithm to a second portion of the generated set of metrics, and generate information indicative of network incompatibility for each of the least one CPE based on the first set of results and the second set of results.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for analyzing WiFi device compatibility are described. In the following description, for purposes of explanation, numerous specific details are set forth in order to provide a thorough understanding of the disclosed embodiments. It will become apparent, however, to one skilled in the art that various embodiments can be practiced without these specific details or with an equivalent arrangement. In other instances, well-known structures and devices are shown in block diagram form in order to avoid unnecessarily obscuring the various embodiments.

Figure 1:
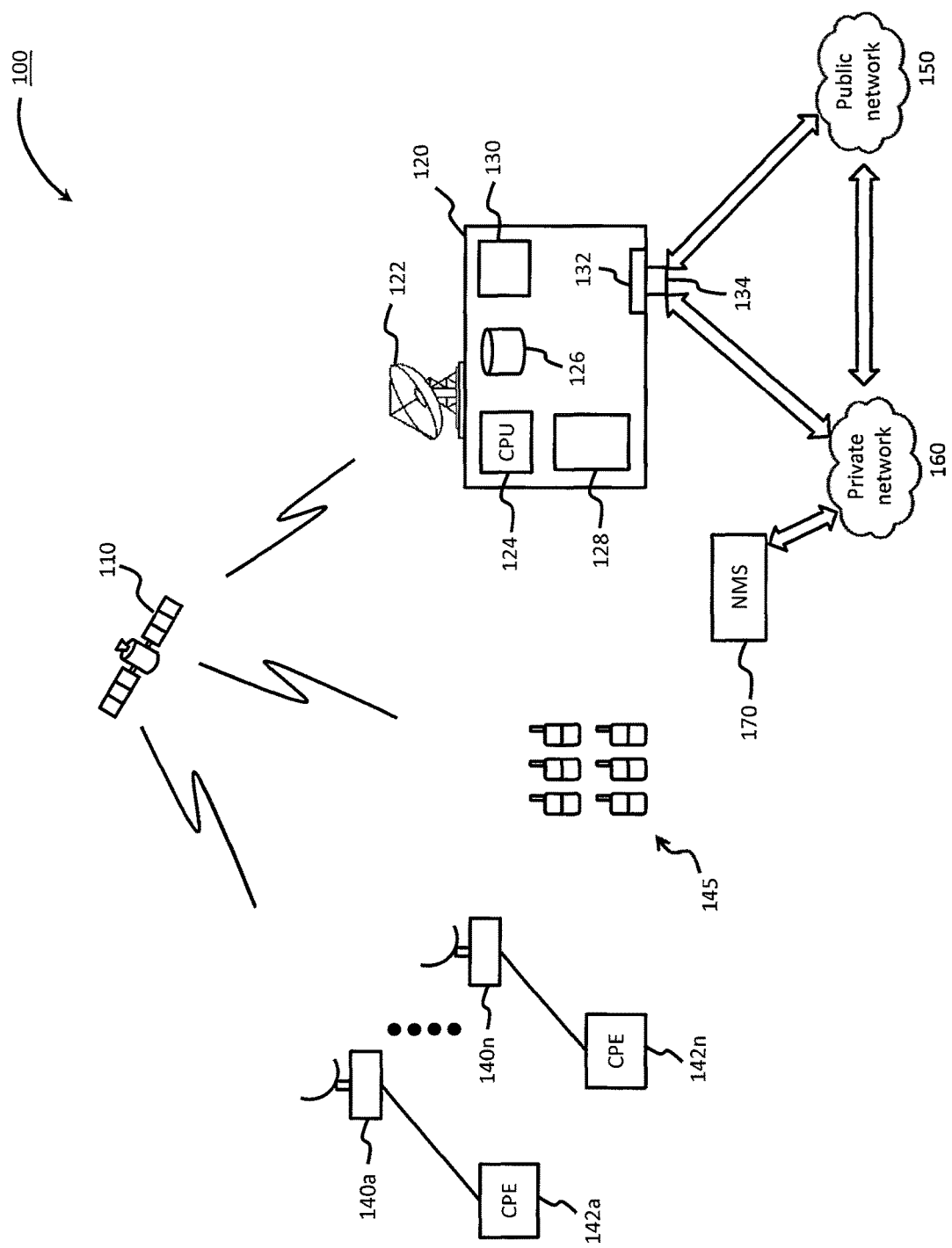
FIG. 1 is a diagram of a system capable of providing of voice and data services, according to at least one embodiment.

FIG. 1 illustrates a satellite communication system 100 capable of providing voice and data services. The satellite communication system 100 (satellite network) includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the terminal 140. Connected appliances can include, without limitation, televisions, home assistants, thermostats, refrigerators, ovens, etc. The network of such devices is commonly referred to as the internet of things (IoT).

According to an exemplary embodiment, the terminals 140a-n can be in the form of very small aperture terminals (VSATs) that are mounted on a structure, habitat, etc. Depending on the specific application, however, the terminals 140a-n can incorporate an antenna dish of different sizes (e.g., small, medium, large, etc.). The terminals 140a-n typically remain in the same location once mounted, unless otherwise removed from the mounting. According to various embodiments, the terminals 140a-n can be mounted on mobile platforms that facilitate transportation thereof from one location to another. Such mobile platforms can include, for example, cars, buses, boats, planes, etc. The terminals 140a-n can further be in the form of transportable terminals capable of being transported from one location to another. Such transportable terminals are operational only after arriving at a particular destination, and not while being transported. Each terminal 140a-n can be configured for relaying traffic between its customer CPEs 140a-140n, a public network 150 such as the Internet, and/or its private network 160 via satellite 110 and gateway 120. The gateway 120 can be configured to route this traffic across the public network 150 and private network 160 as appropriate. The gateway 120 can be further configured to route traffic from the public network 150 Internet and private network 160 across the satellite link to the appropriate terminal 140. The terminal 140 then routes the traffic to the appropriate CPE 140.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal can be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver (RFT) 122, a processing unit (or computer, CPU, etc.) 124, and a data storage unit (or storage unit) 126. While generically illustrated, the processing unit 124 can encompass various configurations including, without limitations, a personal computer, laptop, server, etc. As used herein, a transceiver corresponds to any type of antenna unit used to transmit and receive signals, a transmitter, a receiver, etc. The RFT 122 is usable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system (NMS) 170. The NMS 170 maintains, in part, information (e.g., configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

As illustrated in FIG. 1, the satellite communication system 100 facilitates communication between a satellite network, public networks 150, and private networks 160. Various embodiments, however, can also be configured for providing communication within only a terrestrial network (e.g., public communication networks 150 and private communication networks 160), or within only a satellite network. Thus, while FIG. 1 only illustrates components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
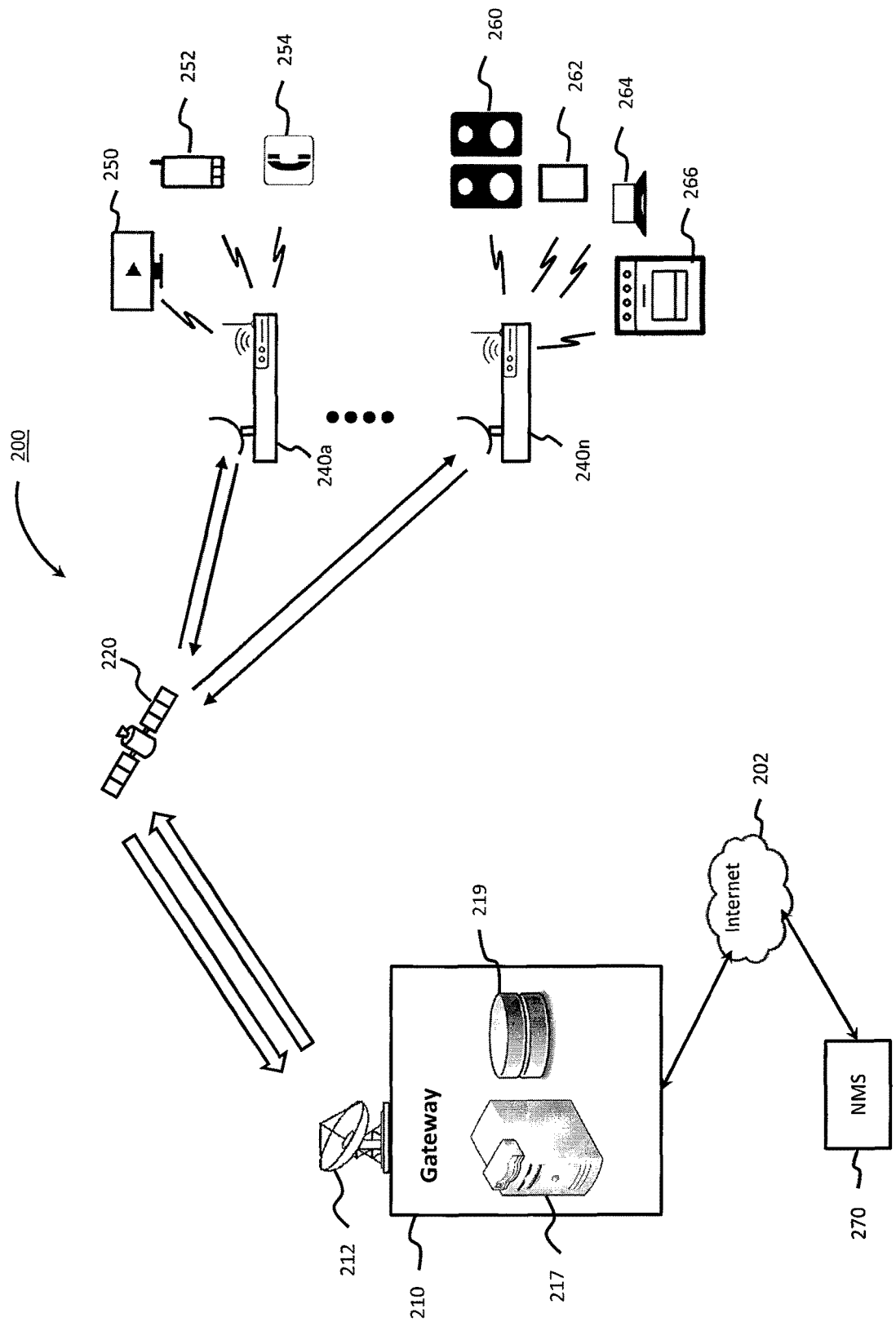
FIG. 2 is a diagram of a system capable of analyzing network operations for device incompatibility, according to one embodiment.

FIG. 2 is a diagram of an exemplary satellite communication system 200 that includes the capability to analyze network compatibility of devices, according to an embodiment. Satellite communication system 200 operates in a manner similar to satellite communication system 100 described in FIG. 1, but includes features that can be configured to provide a communication interface between content and data service providers and end users or customers. Additionally, the satellite communication system 200 can be configured to analyze various network characteristics in order to determine, for example, compatibility issues for user devices or CPEs operating in the satellite communication system 200.

As illustrated in FIG. 2, the satellite communication system 200 facilitates communication between wireless CPEs and the internet, collectively referred to as the satellite network. The satellite communication system 200 includes at least one satellite 220 (only one shown) that supports communications among a number of gateways 210 (only one shown) and multiple satellite terminals 240a-240n. Satellite 220 operates in a manner similar to satellite 110 in FIG. 1 but specifically supports bidirectional communication with each satellite terminal 240a-240n as well as separate bidirectional communication the gateway 210. Each of satellite terminals 240 are similar to terminals 140 described in FIG. 1 and further can be configured for relaying internet protocol (IP) traffic between any CPEs connected to the satellite terminals 240 and the internet 202 through satellite 220 and gateway 210.

According to the illustrated embodiment, the satellite terminals 240 can include wireless routing functionality that supports communications with one or more CPEs as part of a home wireless network (i.e., a WiFi network) within the satellite communication system 200. As illustrated in FIG. 2, the CPEs coupled to terminal 140a can include, for example, a smart television (TV) 250, a phone 252, and an IP phone 254. The CPEs coupled to terminal 140n include wireless speakers 260, a tablet computer 262, a laptop computer 264, and a smart appliance 266.

In other embodiments, different CPEs not illustrated in FIG. 2 can be included in the home wireless network, such as CPEs used as part of the IOT in a smart home. As illustrated in FIG. 2, each of the CPEs can also of different classes or types of CPEs. Each of the CPEs can be classified and grouped together based on various characteristics including, but not limited to, similarity of function, the manufacturer, brand, model number, media access control (MAC) address, software version, device configuration, etc. According to some embodiments, one or more CPEs that are in the same class or type of CPE can be connected to the same satellite terminal (e.g., satellite terminal 240a) or to different satellite terminals (e.g., satellite terminal 240a and satellite terminal 240n).

Each of the satellite terminals 240 can include a storage unit (not shown) for storing information, such as data related to connectivity for one or more of the CPEs. The data can be stored for a predetermined period of time and/or until a communication request is made to provide the data to another device in satellite communication system 200, such as satellite gateway 200. Although terminals 240 are shown including wireless router functionality, some embodiments may include one or more terminals 240 that do not include wireless features. According to such embodiments, an external wireless router can be coupled to the terminal 240 and used to communicate to the CPEs as part of the home wireless network.

The satellite gateway 210 can include various components, implemented in hardware, software, or a combination thereof, to facilitate communication between the terminals 240 and the internet 202. According to an embodiment, gateway 210 can include an RFT 212, a link analyzer 217 and a data storage unit 219. The RFT 212 can be configured and operated in a manner similar to RFT 122 described in FIG. 1. The data storage unit 219 can also be used and configured in a manner similar to that described for storage unit 126. In addition, data storage unit 219 can store and collect data related to the connectivity for one or more CPEs that are connected to the terminals 240. According to various embodiments, satellite gateway 210 can include data storage unit 219 in addition to a storage unit configured in a manner similar to storage unit 126. The satellite gateway 210 can also include various signal and data processing circuits that are configured and operated in manner similar to processing unit 124, baseband unit 128 and fault unit 130. Such components allow satellite gateway 210 to transmit and receive signals containing IP data traffic via satellite 220. The satellite gateway 210 can further include network interface components or circuits, similar to those described for network interface 132, along with one or networking components, such as one or more edge routers, for communicating IP data traffic with the internet 202.

The link analyzer 217 can include specific processing circuits and/or a general processing circuit, such as a CPU, that monitor and analyze one or more operational activities within the satellite communication system 200. The link analyzer can retrieve data from the data storage unit 219 that has been collected from various elements, such as the satellite terminals 140a-n and the RFT 122. The data can be transmitted from the various elements via satellite 220, collected or aggregated by the satellite gateway 210, and stored in data storage unit 219. In some embodiments, the data that is collected or aggregated can be current (or recent) data, such as data taken over the last week or last month. In some embodiments the data can also include past data, such as data taken over a predetermined period (e.g., past three months, 6 months, 12 months, etc.). According to one embodiment, data from one or more CPEs can be continuously collected locally by the satellite terminals 240 and stored for a period of one week. The satellite gateway 210 can collect the data from each of the satellite terminals 240s for a predetermined period and store the data in data storage unit 219.

The link analyzer 217 can further be configured to generate one or more quality indicators or scores based on one or more sets of metrics determined from the collected data. According to some embodiments, the link analyzer 217 can generate a modem link quality indicator for each of the CPEs operating on a wireless connection. The link analyzer 217 can further generate a satellite link quality indicator associated with each satellite gateway 210 used in the satellite communication system 200. The link analyzer can further generate a traffic type quality indicator that assesses the entire network operation between the internet to the home wireless network portion of satellite communication system 200. The generation of one or more of the modem link quality indicators, the satellite link quality indicator, and the traffic type quality indicator can further include the use of one or statistical methods that utilize classification models that use one or both of current data and past data. The generation of one or more of the modem link quality indicator, the satellite link quality indicator, and the traffic type quality indicator can also incorporate one or more machine learning techniques that use one or both of current data and past data. The generation of exemplary sets of metrics and quality indicators as used in the present embodiments will be described in further details below.

The NMS 270 operates in a manner similar to that described for NMS 170 in FIG. 1. According to some embodiments, the NMS 270 can also include, or be configured to operate in a manner similar to a link analyzer, such as link analyzer 217 described above. In these embodiments the data collected for the CPEs can be stored in data storage unit 219 and provided to NMS 270 through the internet 202. The NMS 270 can alternatively include a storage unit is configured and operates similar to storage unit 219.

According to some embodiments, one or more of the one of more of the modem link quality indicator, the satellite link quality indicator, and the traffic type quality indicator generated in the link analyzer 217 can be used alone or in combination, including as part of a correlation or combination function, to provide one or more recommendations to network service operators and or customer experience representative to improve the customer experience with the satellite network used in satellite communication system 200. The recommendations can include a compatibility score for the various types of satellite terminals and/or wireless routers for best interworking via the satellite network 200. The recommendations can also include recommendations for optimal configurations and settings for a specific satellite terminal. The recommendations can further include recommendations for improving or optimizing the set-up of a customer's home wireless network for connectivity. The recommendations can additionally include recommendations on network compatible CPEs and/or indications of incompatible CPEs in order to enhance the customer experience. The recommendations can also provide insight into problem patterns related to network traffic protocols and compatibility across a variety of CPEs and help develop solutions for the customers. The recommendations can further facilitate the generation of alerts and notifications to network operators regarding the status of the satellite network 200 or home wireless networks, such as a degradation in data traffic flows between a satellite terminal 240 and CPEs.

Figure 3:
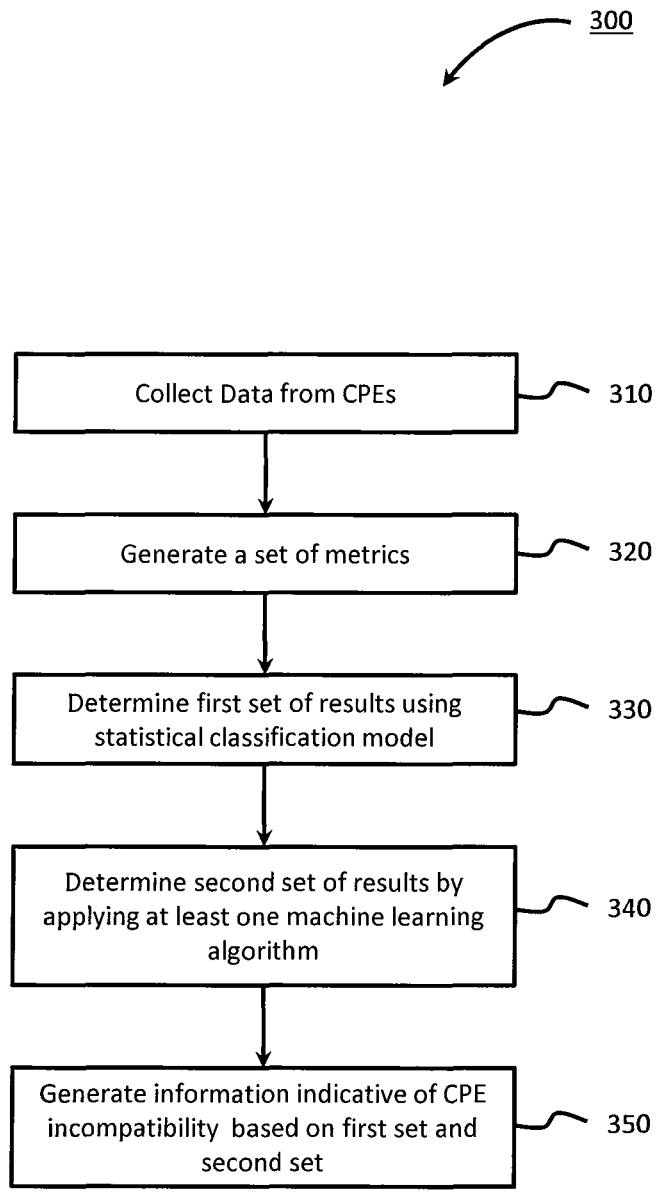
FIG. 3 is a flowchart of a process for analyzing device compatibility in a satellite network, according to one or more embodiments.

FIG. 3 is a flowchart of an exemplary process 300 for analyzing device compatibility in a satellite network, according to one or more embodiments. Process 300 is primarily described in relation to operation of a gateway device, such as satellite gateway 210 as used in a satellite communication system 200 described in FIG. 2. Process 300 can equally be applied to other devices, such as devices similar to NMS 270, that can be configured to perform the steps of process 300. Process 300 can equally be described in relation to operation of other gateways in other communication systems, such as satellite gateway 120 in satellite communication system 100 described in FIG. 1.

At step 310, data related to connectivity for a plurality of CPEs connected to each terminal 240 in a satellite communication system 200 is received and/or collected in satellite gateway 210. The data can originate from the CPEs connected to terminal 240a (e.g., smart TV 250, phone 252, and IP phone 254). The data can also be transmitted from the CPEs (e.g., wireless speakers 260, tablet computer 262, laptop computer 264, and smart appliance 266) to terminal 240n as well as any CPEs connected to terminals in the satellite network. According to some embodiments, the data can originate from other devices in satellite communication system 200, such as satellite terminals 240. The data collected, at step 310, can be stored, for example, in data storage 216.

According to some embodiments, the data can be associated with a set of operating parameters for connectivity in the CPEs or other devices, such as values determined for one or more operating parameters. These operating parameters can be commonly available or generated in either the CPEs or in satellite terminals 240 based on information provided by the CPEs. The set of operating parameters can include, but is not limited to, connectivity type, delay, jitter, congestion, packets transmitted, packets sent, packets received, packet loss, transmitter power, and received signal strength.

According to some embodiments, the data collected, at step 310, can be arranged based on an identifier for each occurrence of a user event or user activity, referred to as a session interval. For example, a session interval can begin when a user initiates an internet search engine to search for a restaurant. The session interval concludes, for example, when the search engine is closed or is left inactive for a period of time. The session interval can also be specified in terms of a period of time or time interval, such as a 60 minute interval.

At step 320, a set of metrics for each of the plurality of CPEs is generated using the data collected, at step 310. The set of metrics can be generated in a link analyzer, such as link analyzer 217, as part of satellite gateway 210. According to some embodiments, the set of metrics can be generated in NMS 270 that can be configured to operate as a link analyzer as described herein. The set of metrics represents one or more combinations of one or more different elements of the collected data that are applied to binary or threshold level types of criteria, such as criteria associated with incompatibility. The combinations can include different elements that are orthogonal to each other in some manner to improve the values for the set of metrics. According to an embodiment, one of the metrics can be the number of occurrences of data values for a signal strength operating parameter being less than a predetermined threshold value, such as −60 decibels referenced to one milliwatt (dBm).

According to some embodiments, the generating, at step 320, can include grouping or aggregating the CPEs together to form a group of similar CPEs. The classification can be performed based on one or more CPE identifiers such as: function, manufacturer, model number, media access control (MAC) address, software version, device configuration, etc. Additionally, the CPEs can be grouped based on the type of terminals to which they are connected, terminal mode, terminal software version, etc.

According to some embodiments, the generating, at step 320, can further include computing values for a set of performance characteristics using the data collected, at step 310, for each CPE. The values computed for the set of performance characteristics are used in place of some or all of the data collected, at step 310, to generate the set of metrics, at step 320. The performance characteristics can represent one or more data elements whose data values are converted to a common or normalized scale. In this manner, the generation, at step 320, is improved as a result of the normalization of highly disparate values for the various elements of the collected data. The set of performance characteristics can include, but is not limited to, a signal quality and a health indicator. The signal quality can be a value that ranges between 1 and 100 associated with the ratio of the received signal strength operating parameter to the level of background noise at the frequency of the received signal. The health indicator can be a value that ranges between 1 and 100, and is a ratio of the number defined time periods (e.g., minutes) when data is communicated error free, based on the packet loss operating parameter, to a specified total number of defined time periods for which communication between the CPE and the satellite terminal occurs. For example, if a CPE (e.g., smart TV 250) attempts to communicate with satellite terminal 140a over a total time of five minutes and three of those minutes are error free, then the health indicator for that hour would be 60. The signal quality and health indicator, as described, each provide a different assessment of the potential data rate at which the CPE is able to communicate with the satellite network before data loss begins to occur.

At step 330, a first set of results is determined from all or a portion of the set of metrics, generated at step 320. According to an embodiment, the first set of results can be determined using one or more statistical methods that incorporate a classification model in link analyzer 217. Such determination can include, for example, application of the statistical methods to classify regions of values within the set of metrics where one or more CPEs or of groups of similar CPEs are operating differently when compared to the other CPEs. Such operational differences can relate to network connectivity, particularly wireless connectivity. According to some embodiments, the statistical methods can be used to generate the results using both the current data collected at step 310, as well as past data collected and stored in data storage unit 219.

The first set of results can be used to identify one or more CPEs that that exhibit potential connectivity issues when operating in the satellite network. According to some embodiments, the first set of results provides an indication of which CPEs, or groups of similar CPEs, are incompatible with an operational aspect of the satellite network. For example, the first set of results can indicate that smart TV 250 is incompatible with satellite terminal 240a when used in the customer's wireless home network.

According to some embodiments, the first set of results can include a value for one or more quality indicators, such as the modem link quality indicator, the satellite link quality indicator, the traffic type quality indicator etc., for each of the CPEs or groups of similar CPEs. The values of the quality indicators can be determined based on applying the one or more statistical methods, at step 330, and can be different from the values of quality indicators determined using other methods. According to at least one embodiment, a CPE or group of similar CPEs having a quality indicator value that is below a predetermined threshold value is labeled as incompatible with the satellite network. The predetermined threshold can be set based, for example, on specific system implementations and/or desired QoS levels.

At step 340, a second set of results is determined from all, or a portion, of the set of metrics, generated at step 320. The second set of results can be determined by applying one or more machine learning algorithms to the second portion of the set of metrics in link analyzer 217. According to one or more embodiments, the machine learning algorithms can include, for example, random forest, K nearest neighbors, support vector machine, artificial neural network, ensemble voting classifier, clustering, association rules, dimensionality reduction, etc. The algorithms can be fine tuned to produce predictions for network incompatibility of devices (or CPEs) operating on wireless (WiFi) connections based on the collected connectivity data. The random forest (RF) algorithm is a machine learning model for classification and regression by constructing a forest of decision trees. Each tree takes different features and different bunches of row indexes. Primary parameters used to tune the random forest model for maximum accuracy include the number of trees and the depth of the individual tree. The K nearest neighbors (KNN) algorithm is a non-parametric method used for classification and regression. The prediction result is classified by a vote of its neighbors. The primary parameter to tune is the K number. The support vector machine (SVM) algorithm is a discriminative classifier defined by a separating hyperplane. Based on a kernel function, a non-linear classification can be achieved. The primary parameters to tune include gamma ($\delta$) and C, which balance the underfitting and overfitting of the models. The artificial neural networks algorithm is based on a collection of connected units or nodes called neurons. The parameters tuned include a number of hidden layers and a corresponding number of neurons in each layer. The voting classifier is an ensemble algorithm based on the three models including random forest, K nearest neighbors, and support vector machine. The clustering algorithm is a technique that can be used to group unclassified data into different categories based on commonality patterns within the data. The association rules algorithm utilizes predefined rules to identify relationships between components of a dataset. The dimensionality reduction algorithm can be applied to data containing a high number of features in order to reduce the number of features while preserving the integrity of the dataset.

The determination at step 340, applies at least one machine learning algorithm to predict and identify specific regions of values within the set of metrics where one or more CPEs or groups of groups of similar CPEs are operating differently. The machine learning algorithm operates differently from purely statistical methods described above by using regression processing as well as classification processing. The machine learning algorithm can also include a training step in order to improve the generation and prediction of results. According to some embodiments, the machine learning algorithm can be an unsupervised learning algorithm, with classification and labeling performed by the algorithm, or a supervised learning algorithm, with classification and labeling provided to the algorithm as part of the input data. According to some embodiments, the machine learning algorithm used at step 330 can generate the results using both the data collected at step 310, as well as past data collected and stored in data storage unit 219. According to one implementation, an unsupervised machine learning algorithm is first used to label the dataset based on predetermined thresholds of expected group size using 3 months of collected data. Next, a supervised machine learning algorithm is used to create the learning model for future predictions. The prediction data includes one month of collected data, such as the current month.

The second set of results can be used to identify one or more CPEs that exhibit potential connectivity issues when operating in the satellite network, based on application of the machine learning algorithms. The second set of results can be the same as, or different than, the first set of results, determined at step 330. According to some embodiments, the second set of results provide another indication of which of CPEs, or groups of similar CPEs, are incompatible with aspects of the satellite network. For example, the second set of results can indicate that smart TV 250 is incompatible with satellite terminal 240a when used in a customer's wireless home network and tablet computer 262 is incompatible with satellite terminal 240n when used in another customer's wireless home network.

According to some embodiments, the second set of results can also include a value for one or more quality indicators as described above. The values of the quality indicators determined based on applying the machine learning algorithm can be different from the values of quality indicators determined based on applying the statistical methods. According to various, a first portion of the set of metrics can be used to determine the first set of results, and a second portion of the set of metrics can be used to determine the second set of results. The first and second portions can be separate portions. For example, the set of metrics can include five metrics, with the first portion including the first two metrics and the second portion including the last three metrics. The first and second portion can alternatively overlap and include one or more of the same metrics. For example, the set of metrics can include five metrics, with the first portion including the first two metrics and the second portion including all five metrics.

At step 350, information indicative of network incompatibility for the CPEs is generated, based on the first set of results determined at step 330 and the second set of results determined at step 340. According to some embodiments, the information can include a list of CPEs, or groups of similar CPEs, that have been identified as incompatible with the satellite network. According to additional embodiments, the list of CPEs can be generated in link analyzer 217 by applying a combination, comparison, or cross-correlation function to the first set of results and the second set of results. According to further embodiments, the list of CPEs can be generated by applying an inner join function to the first set of results and the second set of results. The inner join function generates a list of CPEs that includes only the results that are included in both the first set of results, at step 330, and the second set of results, at step 340. According to still further embodiments the information can include one or more of: a listing of CPEs and at least one compatibility score, configuration recommendations for specific terminals, configuration information for specific CPEs, and recommendations for compatible CPEs.

According to the illustrated embodiment, process 300 utilizes an ensemble model to generate information indicative of incompatible CPEs in the satellite network. The ensemble model combines the one or more statistical methods, at step 330, and at least one machine learning algorithm, at step 340 to generate the information. The one or more statistical methods determine a first set of results, such as a first set of incompatible CPEs, using a classification model applied to both current data and past data collected. The machine learning algorithm determines a second set of results, such as a second list of incompatible CPEs, using regression and classification models generated by first processing past data and subsequently processing the current data. The first list of results and the second list of results are then used to generate the information indicative of network incompatibility, such as a final list of incompatible CPEs.

One or more of the steps of process 300 can be performed in a different order than as shown in FIG. 3. According to some embodiments, determining the set of results using a statistical model (step 330) can be performed after determining the set of results by applying a machine learning algorithm (step 340). According to some embodiments, determining the set of results using a statistical model can be performed in parallel with, or at the same time as, determining the set of results by applying a machine learning algorithm. According to various embodiments, some or all the steps of process 300 can be repeated on a periodic, or as needed, basis in order to generate new information indicative of network incompatibility for the CPEs. For example, process 300 can be repeated daily, weekly, monthly, etc.

Figure 4:
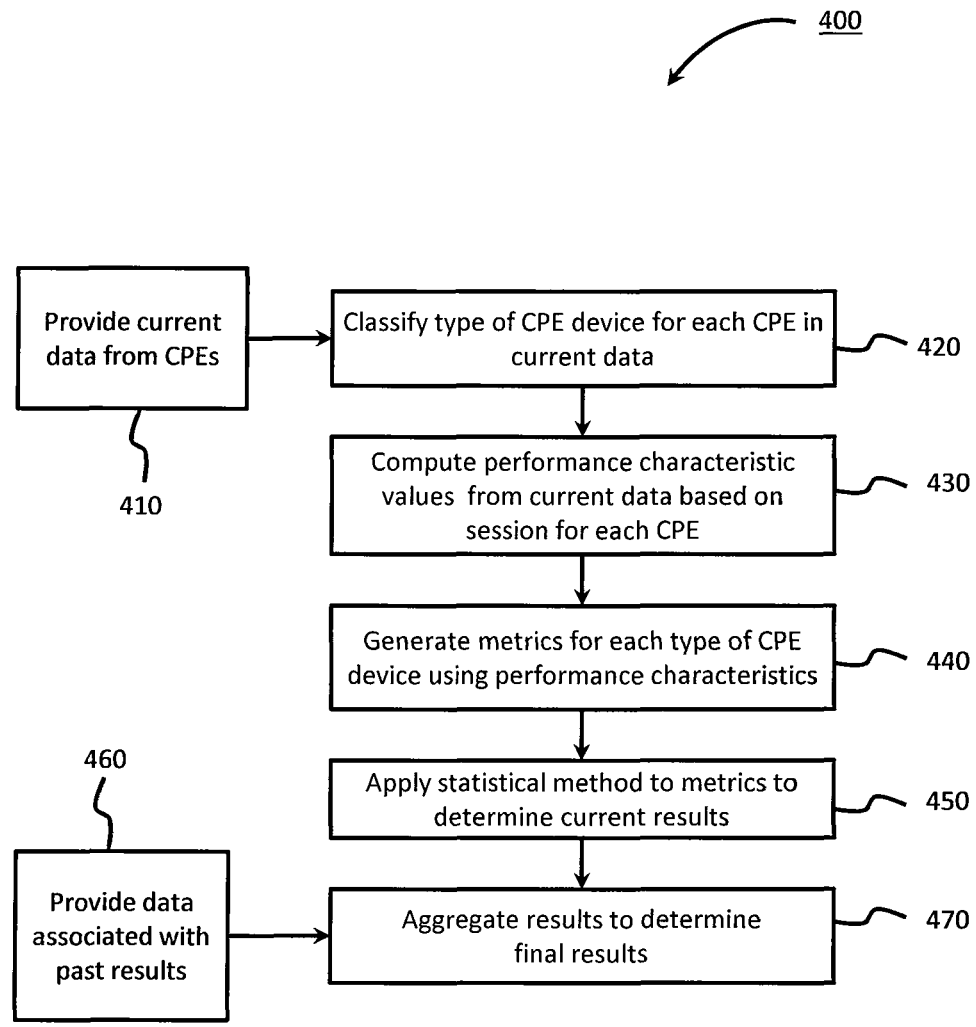
FIG. 4 is a flowchart of a process for determining device compatibility using a statistical method, according to one or more embodiments.

FIG. 4 is a flowchart of a process 400 for determining CPE compatibility using a statistical method, according to at least one embodiment. Process 400 is primarily described in relation to operation of a gateway device, such as satellite gateway 210. Process 400 can equally be implemented on other devices, such as NMS 270. At step 410, current data related to connectivity for one or more CPEs connected to each terminal 240 is provided to satellite gateway 210. This can be done in a manner similar to that described at step 310 in FIG. 3. The current data includes values for a set of operating parameters along with session interval identification for each of the values. According to one embodiment, the operating parameters can include connectivity type, delay, jitter, congestion, packets transmitted, packets sent, packets received, packet loss, transmitter power, received signal strength, etc. The values for each of the operating parameters can include, for example, identifiers on 60 minute session intervals along with one day session intervals.

The current data can also include identification information for each of the CPEs. The identification information can include one or more identification characteristics similar to those described above. According to some embodiments, the device identification information can include a MAC address assigned to each of the CPEs. At step 420, each one of the CPEs is classified and placed into one CPE device type group by link analyzer 217 based on the identification information included in the current data for the CPEs. Each group can be identified by a different CPE device type. According to one embodiment, each of the CPEs it classified based on the first portion of the MAC address. For example, any of the CPEs having a first portion of the MAC address equal to 00:19: C5:4 would be classified into the same group identified as CPE device type 00:19: C5:4. The CPEs in this group can, for instance, include any smart TV within a range of model numbers and manufactured by a specific TV manufacturer. Additional groups can also be classified in a similar manner. As can be appreciated, manufacturers of devices having network connectivity can be assigned specific and unique range address prefixes for the first portion of the MAC address.

At step 430, values for one or more performance characteristics are computed in link analyzer 270 for each CPE device type. The values for the performance characteristics can be computed using the values for the set of operating parameters, received as part of the current data for each CPE included in that CPE device type group. As previously discussed, the performance characteristics represent one or more of the operating parameters that have been processed and normalized to a scale. According to one embodiment, two performance parameters can be computed and include a signal quality and a health indicator as described at step 330 in FIG. 3.

At step 440, values for one or more metrics for each CPE device type, identified at step 420, are generated by link analyzer using the performance characteristics computed at step 430. According to at least one embodiment, two different metrics can be used. The first metric is defined as the ratio of the number of sessions having a signal quality value that is less than 30 and a health indicator value that is less than 80, to the number of sessions having a signal quality value that is less than 30 and a health indicator value that is greater than 80. The first metric is referred to as poor signal bad health ratio (pz_bad_hi_ratio). The second metric is defined as the ratio of the number of 60 minutes sessions having a signal quality value that is greater than 30 and a health indicator value that is less than 80, to the number of 60 minute sessions having a signal quality value that is greater than 30 and a health indicator value that is greater than 80. The second metric is referred to as a good signal health ratio (gz_bad_hi_ratio). According to at least one embodiment, the first and second metrics are obtained using signal quality values and health indicator values collected over one daily session interval. For each of the two metrics, ratio values are generated by processing the performance characteristics for each of the CPE device types classified at step 420, over all of the sessions provided in the current data. According to some embodiments, the values for the metrics can be stored in data storage unit 219.

According to one or more embodiments, two checks can be applied to these metrics. First, it can be determined whether the second metric (gz_bad_hi_ratio) exceeds a predetermined threshold indicative of a minimum requirement to be considered an incompatible group. According to a specific implementation, this threshold is selected to be 1. Thus, a value greater than 1 for the second metric means that over half of the sessions with good signal manage to have bad health indicators. Next, the count for the first metric is compared to the count for the second metric. A higher value for the second metric is indicative of the health indicator being more frequently bad as the signal quality improved. If both of the checks are true, then the day is labeled as 'possible_bad_mac_group.' If a CPE group has over a configured threshold (e.g., 50%) then it is labeled as incompatible. This list of CPE groups is kept as the statistically determined list.

At step 450, at least one statistical method is applied to the metrics generated at step 440 to determine one or more results associated with the current data. As described above the one or more results can be used to represent incompatibility of a type of CPE with the satellite network. The one or more results are determined by a statistical classification analysis of one or more logical expressions that include one or more of the metrics to identify relationships and thresholds for values ranges or regions of the metrics for each of the CPE types. According to an embodiment, one of the results can be represented by the logical expression for a region covered by the metrics gz_bad_hi_ratio and pz_bad_hi_ratio and bound by:

gz_bad_hi_ratio>1.0 AND
gz_bad_hi_ratio>pz_bad_hi_ratio

The logical expression is evaluated using the values for the metrics generated at step 440 for each CPE device type. Any CPE device type that returns a "true" value (e.g., binary value of 1) is included as a result associated with the current data.

At step 460, information associated with the past results generated from past data is provided to link analyzer 217. The information associated with the past results can be stored in, and retrieved from, data storage unit 219. The information can include the past results from previously performing the steps of process 400 over a specified time period. The information can also include one or more metrics used to determine the past results. According to one embodiment, the past results determined from data covering the past three months along with both metrics described above is provided to link analyzer 217.

At step 470, some or all of the information associated with past results is aggregated with the current results to produce final results. According to one or more embodiments the final results can include one or more of quality indicators, compatibility scores, or other indicators for the CPE device types, similar to the quality indicators described above. According to some embodiments, the aggregation can also include additional processing in order to produce the final results. The additional processing can, in some embodiments, include generating additional metrics and/or applying the statistical method again to the aggregated results. According to one embodiment, an additional metric is generated using the results generated at step 450 along with the past results provided at step 460. The additional metric is defined as the ratio of the number of days that a device type has been identified as being incompatible to the total number of days of aggregated results, referred to as dev_type_inc_ratio. The statistical method is applied to the additional metric to determine an aggregate result dev_type_inc_ratio>0.5

According to some embodiments, one or more of the steps in process 400 can be used as part of implementing an ensemble process such as described with respect to FIG. 3. For example, steps 420 to 470 can be included as part of process 300, adding to and/or replacing steps 320 and 330. According to some embodiments, process 400 can be modified to exclude steps that are not needed. For example, step 420 can be excluded if no classification of the CPEs is needed or possible. Additionally, according to some embodiments, process 400 can be modified to add steps to implement additional processing. For example, process 400 can be modified to add a step for applying a second statistical method in a manner similar to step 450.

Figure 5:
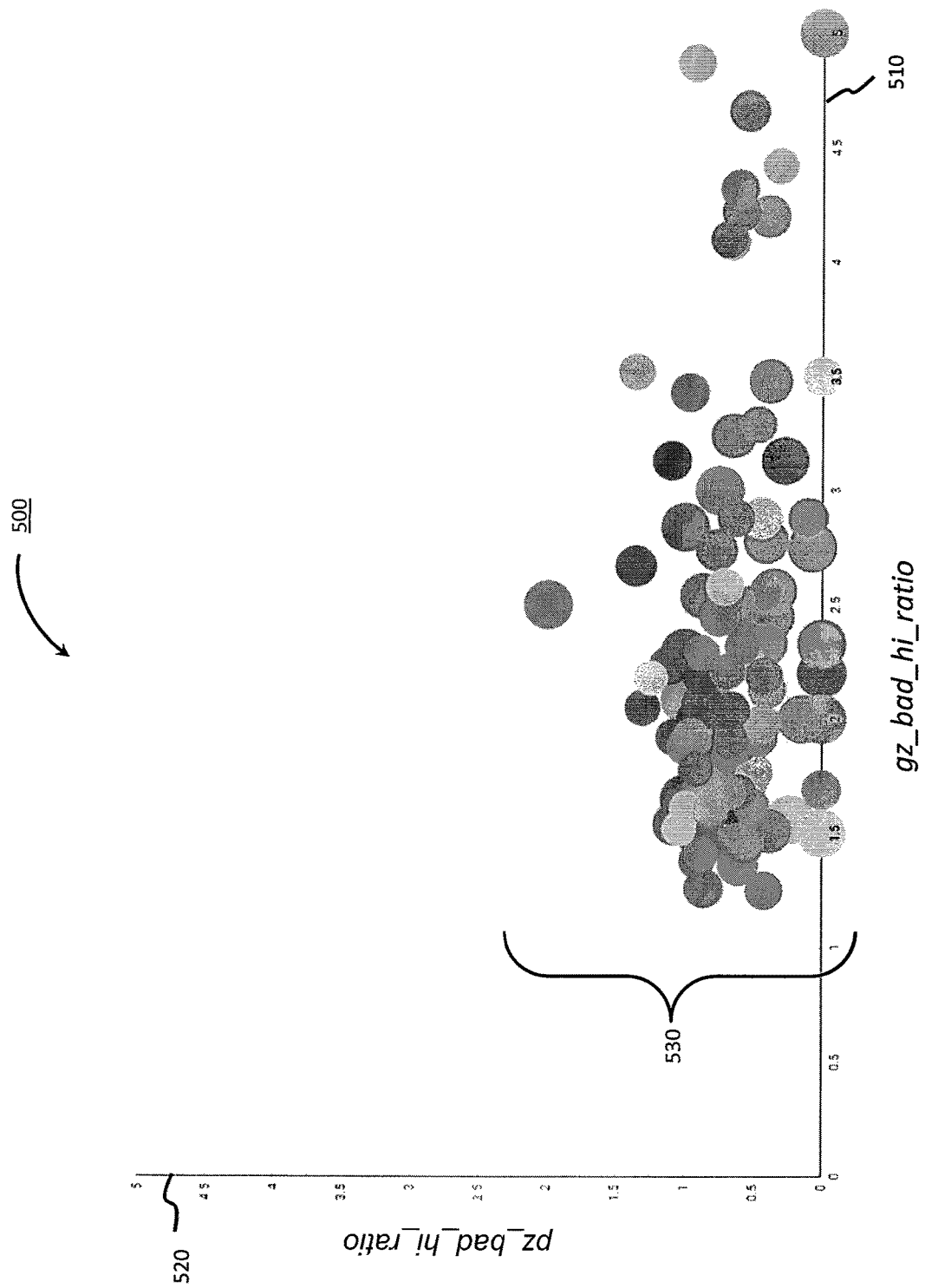
FIG. 5 is a graph illustrating the device compatibility results using the process described in FIG. 4.

FIG. 5 is a graph 500 illustrating the device compatibility results using a process such as process 400. Graph 500 includes an x-axis 510 representing values for the metric gz_bad_hi_ratio and a y-axis 520 representing values for the metric pz_bad_hi_ratio. A collection of data points 530 is shown representing the different device types (i.e., CPE types) that were identified as part of aggregating the results at step 470. The collection of data points 530 is based on processing current data along with information (e.g., metrics and results) associated with past data from 1000 CPEs connected to satellite terminals. According to the illustrated embodiment, all the points in the set of data points 530 also meet the determination condition established for the results, at step 450. Each one of the data points can include an indicator or a mechanism, such as a legend or pop-up window, (not shown) for identifying the associated CPE device type. As illustrated in FIG. 5, some of the data points in the set of data points 530 have a different size than other data points. The different size data points represent the different number of CPEs are included in the group for that CPE device type. According to other embodiments, the data points can all be uniform and the different number of CPEs in a group for a CPE device type can be indicated in a different manner or not at all.

Figure 6:
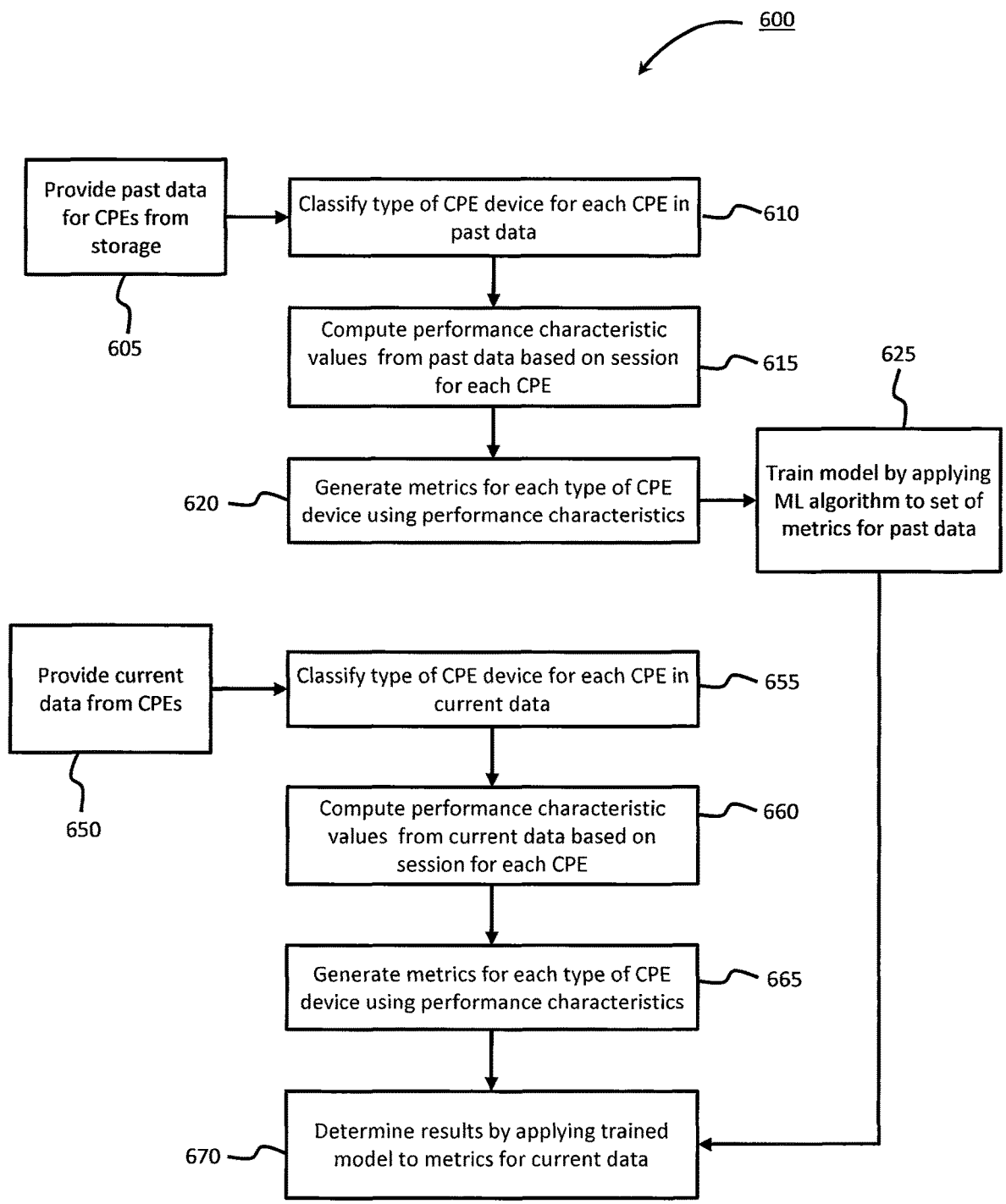
FIG. 6 is a flowchart of a process for determining device compatibility using a machine learning algorithm, according to one or more embodiments.

FIG. 6 is a flowchart of a process 600 for determining a list of results for device compatibility using a machine learning algorithm, according to one or more embodiments.

At step 605, past data related to connectivity for one or more CPEs connected to each terminal 240 in a satellite communication system 200 is retrieved from the data storage unit 219 for use in the link analyzer 217. The past data includes values for a set of operating parameters along with session interval identification for each of the values and identification information for each of the CPEs, similar to that described at step 410 in FIG. 4. According to one embodiment, the operating parameters can include connectivity type, delay, jitter, congestion, packets transmitted, packets sent, packets received, packet loss, transmitter power, and received signal strength. The values for each of the operating parameters can include identifiers on 60 minute session intervals along with one day session intervals. The past data can encompass all data collected for each over a previous period of time. According to one embodiment, the previous period of time is three months.

At step 610, each one of the CPEs for which the past data has been retrieved is classified and placed into one CPE device type group by link analyzer 217. The classification is performed using the device identification information provided with the past data for the CPEs in a manner similar to that described at step 420 in FIG. 4. According to one embodiment, each of the CPEs is classified based on the first portion of the MAC address as described above. At step 615, values for one or more performance characteristics are computed in link analyzer 217 for each CPE device type in a manner similar to that described at step 430 in FIG. 4. According to one embodiment, two performance parameters can be computed and include a signal quality and a health indicator as described at step 330 in FIG. 3.

At step 620, values for one or more metrics for each CPE device type identified at step 610 are generated in link analyzer 217 using the performance characteristics computed at step 615. The metrics can be generated in a manner similar to that described in step 440 in FIG. 4. According to one embodiment, the same two metrics described at step 440 of FIG. 4 can be used. According to some embodiments, more than two metrics can be used, and the metrics used at step 620 can be different from the metrics used at step 440.

At step 625, a model is trained in link analyzer 217 as part of a training step using a machine learning algorithm and the one or more metrics generated at step 620. The machine learning algorithm utilized can include one or more machine learning algorithms described at step 340 in FIG. 3. According to one embodiment, a random forest machine learning algorithm is utilized. According to one or more embodiments, a supervised machine learning algorithm can be utilized. The supervised machine learning algorithm can use metrics that have been previously generated and classified at step 620. According to some embodiments, the model can be trained, at step 625, as part of a training phase using an unsupervised machine learning algorithm. The training can generate one or more additional metrics or modify the metrics generated at step 620 by constructing a joint distribution based on the performance characteristics associated with the past data. In these embodiments, applying the training, at step 625, can also include identifying or determining one or more initial criteria or values that are used to indicate incompatibility in a network for one or more of the metrics.

At step 650, current data related to connectivity for one or more CPEs connected to each terminal 240 is received at satellite gateway 210. The current data includes values for a set of operating parameters along with session interval identification for each of the values and identification information for each of the CPEs similar to that described at step 410 in FIG. 4. According to some embodiments, the set of operating parameters and the session interval used for the session interval identification is the same as used at step 605. According to one embodiment, the current data includes all data for the CPEs over the past month. According to some embodiments, the CPEs for which the current data is received are the same CPEs for which the past data was retrieved at step 605. According to other embodiments current data for any CPE currently connected to a terminal 240 is received regardless of whether past data for that CPE has been retrieved at step 605.

At step 655, each one of the CPEs for which the current data has been received is classified and placed into one device type (i.e., CPE type) group by link analyzer 217 in the same manner as described at step 610. At step 660, values for one or more performance characteristics are computed in link analyzer 217 for each CPE type in the same manner and including the same performance characteristics as described at step 615. At step 665, values for one or more metrics for each CPE type are generated using the performance characteristics computed at step 430 in the same manner described at step 620.

At step 670, the model trained at step 625 is applied to the one or metrics generated at step 665 to determine final results. The final results represent a prediction that indicates which of the CPE device types, identified, and classified at step 655, are incompatible with the network. According to one or more embodiments the final results can include one or more of quality indicators, compatibility scores, or other indicators for the CPE device types, similar to the quality indicators described above. According to some embodiments, one or more of the steps in process 600 can be used in implementing an ensemble process such as described in FIG. 3. For example, steps 620 and 655 along with steps 625 and 670 can be included as part of process 300, adding to and/or replacing step 320 along with step 340.

According to some embodiments, process 600 can be modified to add or replace one or more steps in process 600 with one or steps that are used in other processes such as process 400 described above. According to further embodiments, process 600 can be modified to omit steps that are not needed. For example, steps 610 and 655 can be deleted if no classification of the CPEs is needed or possible. Additionally, according to some embodiments, process 600 can be modified to add steps to implement additional processing. For example, process 600 can be modified to add steps for applying a second machine learning algorithm in a manner similar to steps 625 and 670.

Figure 7:
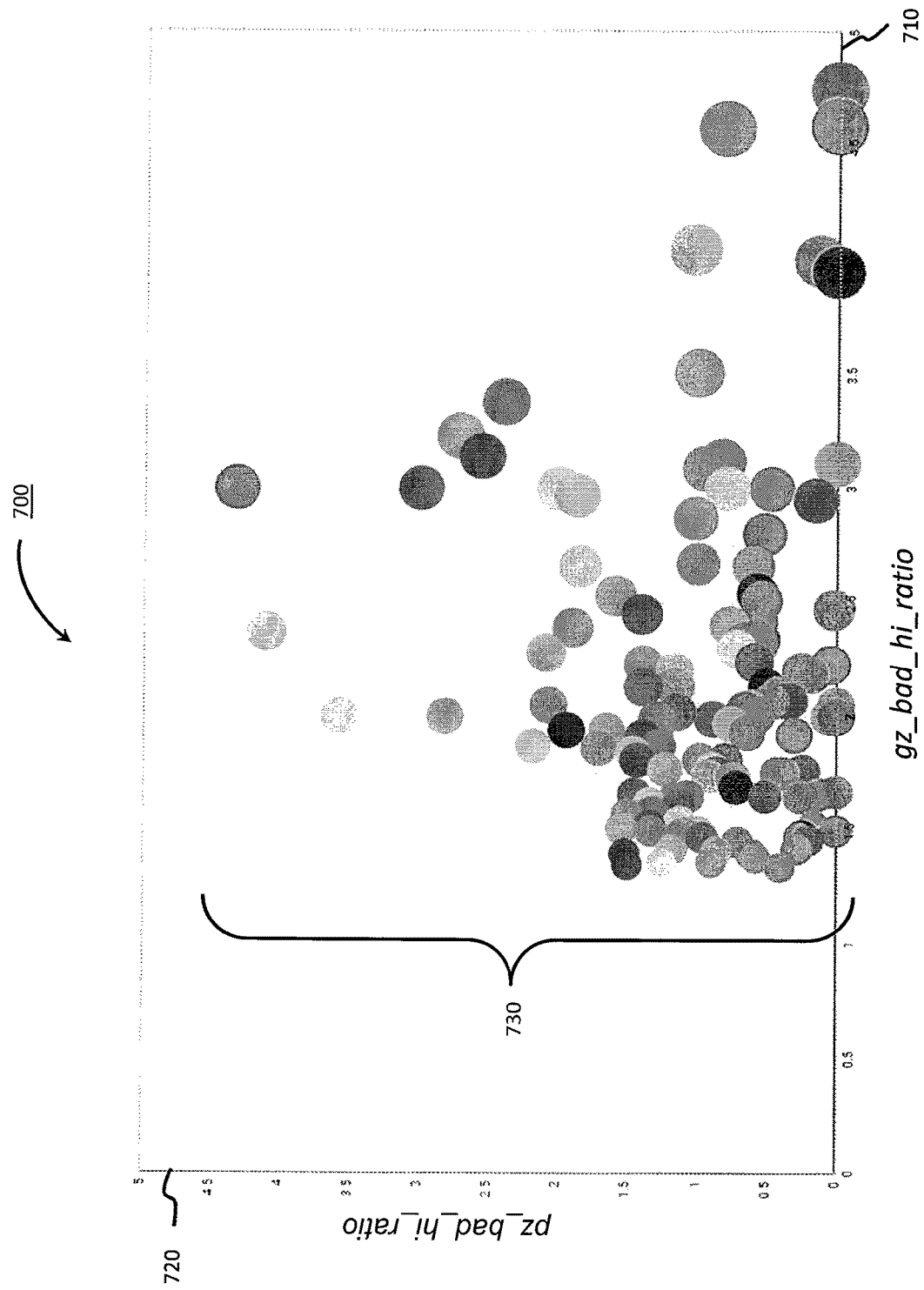
FIG. 7 is a graph illustrating the device compatibility results using the process described in FIG. 6.

FIG. 7 is a graph 700 illustrating the device compatibility results using a process such as process 700 described in FIG. 7. Graph 700 includes an x-axis 710 representing values for the metric gz_bad_hi_ratio and a y-axis 720 representing values for the metric pz_bad_hi_ratio using the same scale as used in graph 500 in FIG. 5. A collection of data points 730 is shown representing the different CPE device types that were identified as part of generating the results, at step 670. The collection of data points 730 is based on processing current data and past data from the same 1000 CPEs connected to satellite terminals using process 600. According to the illustrated embodiment, the collection of data points 730 is different from the collection of data points 530. However, one or more individual data points can be the same between the collection of data points 730 and the collection of data points 530. One or more of the data points in the collection of data points 730 can be the same or different sizes as described in FIG. 5. Further, each one of the data points can include an indicator or mechanism for identifying the associated CPE device type as described in FIG. 5.

Figure 8:
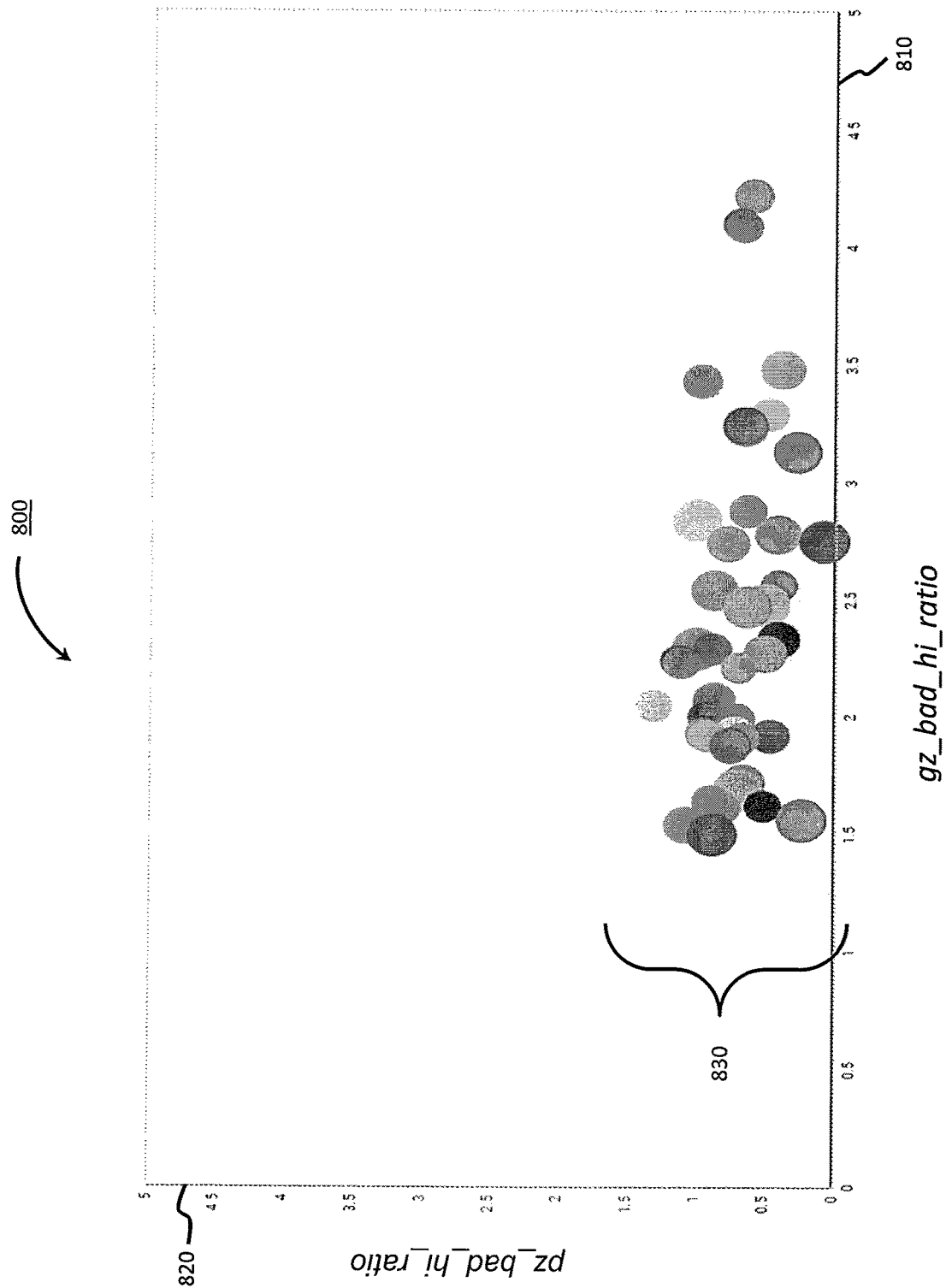
FIG. 8 is a graph, illustrating the device compatibility results based on a combination of the results from the process described in FIG. 4 and the results from the process described in FIG. 6.

FIG. 8 is a graph 800 illustrating the CPE device compatibility results based on a combination of the results from the process described in FIG. 4 and the results from the process described in FIG. 6. Graph 800 includes an x-axis 810 representing values for the metric gz_bad_hi_ratio and a y-axis 820 representing values for the metric pz_bad_hi_ratio using the same scale as used in graph 500 and graph 700. A collection of data points 830 is shown representing the different CPE device types that were identified as part of combining the results determined at step 470 and the results determined at step 670. The combining can be performed by applying a combination, comparison, or cross-correlation function such as that described above with respect to FIG. 3. According to one embodiment, the combining is performed by applying an inner join function to the results determined at step 470 and the results determined at step 670.

According to the illustrated embodiment, the collection of data points 830 is less than either the collection of data points 530 or the collection of data points 730. Thus, the results from process 400 and process 600 are not the same. However, some of the individual data points are the same between the collection of data points 730 and the collection of data points 530 indicating that in some cases, process 400 and process 600 can produce the same results. One or more of the data points in the collection of data points 830 can be the same or different sizes as described in FIG. 5. Further, each one of the data points can include an indicator or mechanism for identifying the associated CPE device type as described in FIG. 5.

Various features described herein can be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program can be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors can be contained on a single unitary IC die or distributed across multiple components. Such exemplary hardware for implementing the described features is detailed below.

Figure 9:
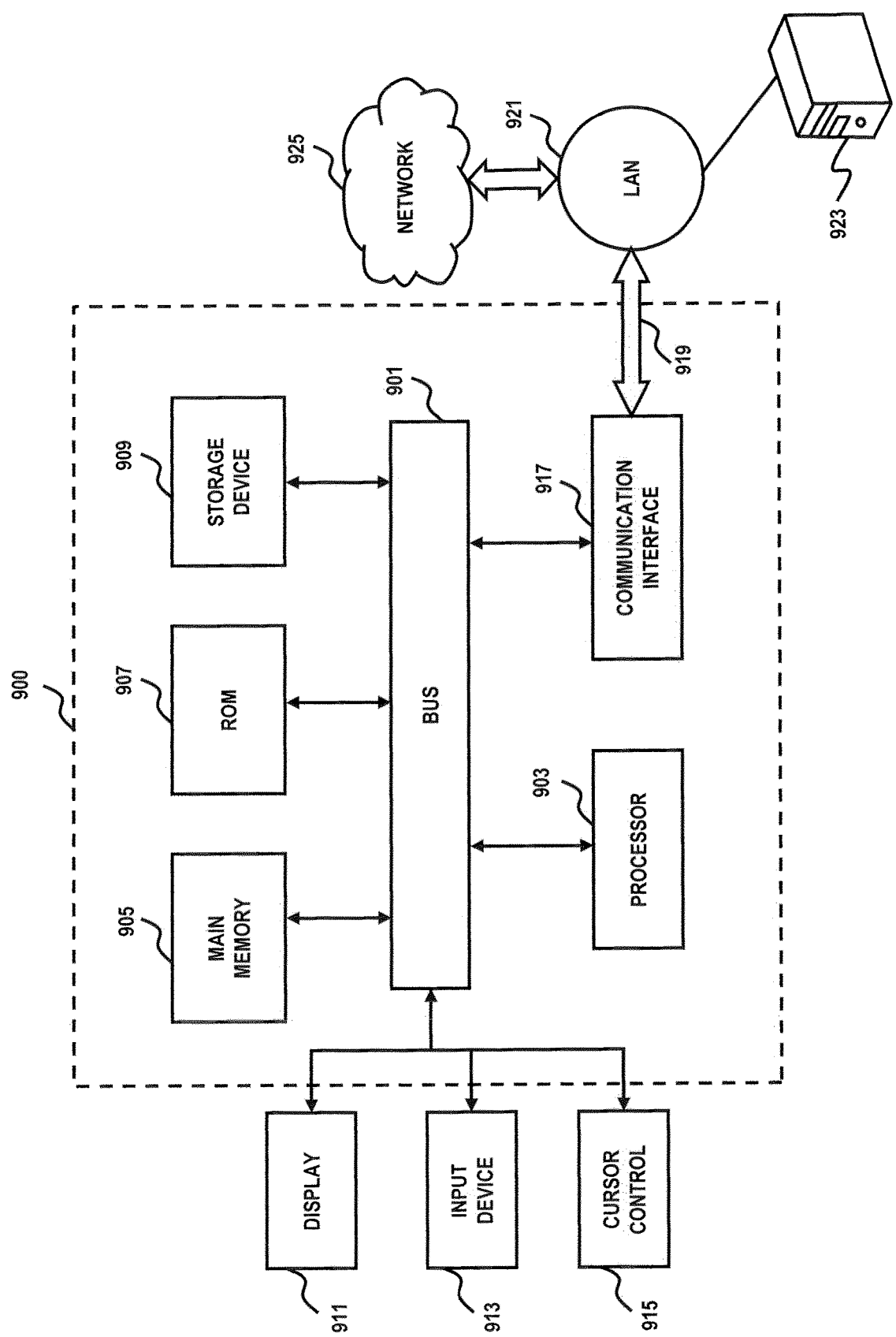
FIG. 9 is a diagram of a computer system that can be used to implement various exemplary features and embodiments.

FIG. 9 is a diagram of a computer system 900 that can be used to implement features of various embodiments. The computer system 900 includes a bus 901 or other communication mechanism for communicating information and a processor 903 coupled to the bus 901 for processing information. The computer system 900 also includes main memory 905, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 901 for storing information and instructions to be executed by the processor 903. Main memory 905 can also be used for storing temporary variables or other intermediate information during execution of instructions by the processor 903. The computer system 900 can further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 can be coupled via the bus 901 to a display 911, such as a light emitting diode (LED) or other flat panel displays, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order to facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement can also be employed to execute the instructions contained in main memory 905. In alternative embodiments, hard-wired circuitry can be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 can be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 917 can be a local area network (LAN) card (e.g., for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed.

The network link 919 typically provides data communication through one or more networks to other data devices. For example, the network link 919 can provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 can execute the transmitted code while being received and/or store the code in the storage device 909, or other non-volatile storage for later execution. In this manner, the computer system 900 can obtain application code in the form of a carrier wave.

The term "computer-readable medium" as used herein refers to any medium that participates in providing instructions to the processor 903 for execution. Such a medium can take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 10:
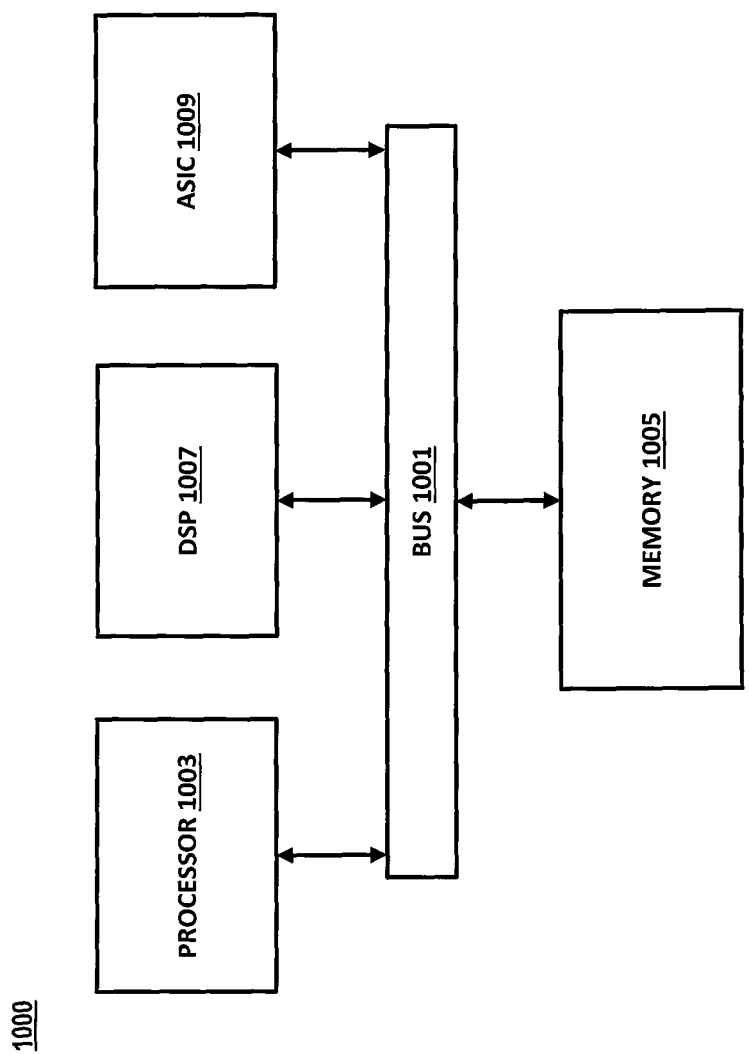
FIG. 10 is a diagram of a chip set that can be used to implement various exemplary features and embodiments.

FIG. 10 illustrates a chip set 1000 upon which features of various embodiments can be implemented. Chip set 1000 is programmed to implement various features as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of the figures.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 can include one or more processing cores with each core configured to perform independently. A multi-core processor enables multiprocessing within a single physical package. Examples of a multi-core processor include two, four, eight, or greater numbers of processing cores. Alternatively, or in addition, the processor 1003 can include one or more microprocessors configured in tandem via the bus 1001 to enable independent execution of instructions, pipelining, and multithreading. The processor 1003 can also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to perform specialized functions not easily performed by a general purpose processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, rewritable optical disk, etc.) and static memory (e.g., ROM, CD-ROM, DVD, BLU-RAY disk, etc.) for storing executable instructions that when executed perform the inventive steps described herein. The memory 1005 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    collecting data associated with each of at least one customer premise equipment (CPE) connected to a client terminal in a satellite network during a respective interval, the data being related to connectivity of the CPE for performing data communications over the satellite network via the client terminal;
    generating a set of metrics associated with each of the at least one CPE by evaluating the data collected during the respective interval based on criteria associated with compatibility of the CPE for the data communications over the satellite network via the client terminal;
    determining a first set of results by applying at least one statistical method to at least a first portion of the generated set of metrics for the interval, wherein the first set of results indicates whether one or more CPEs or groups of similar CPEs exhibit potential compatibility issues for the data communications over the satellite network via the client terminal;
    determining a second set of results by applying at least one machine learning algorithm to at least a second portion of the generated set of metrics for the interval, wherein the second set of results indicates whether the one or more CPEs or groups of similar CPEs exhibit the potential compatibility issues for the data communications over the satellite network via the client terminal; and
    generating information indicative of the potential compatibility issues based on the first set of results and the second set of results.

2. The method of claim 1, wherein the data related to connectivity for each CPE includes data providing identification information for the CPE.

3. The method of claim 2, wherein the generating the set of metrics further comprises aggregating the CPE into one or more groups of similar CPEs using the identification information.

4. The method of claim 1, wherein the data associated with each of the at least one CPE includes data associated with a set of operating parameters for each the at least one CPE, the set of operating parameters including at least one of connectivity type, delay, jitter, congestion, packets transmitted, packets sent, packets received, packet loss, and signal strength.

5. The method of claim 1, wherein the generating the set of metrics further comprises computing values for a set of performance characteristics for each CPE based on the collected data associated with each of the at least one CPE, and using the computed values in place of at least some of the collected data for the generation of the set of metrics.

6. The method of claim 5, wherein at least one of the performance characteristics from the set of performance characteristics represents a value range of at least one operating parameter as a normalized value range of 1 to 100.

7. The method of claim 5, wherein the set of performance parameters includes at least one of a signal quality and a health indicator.

8. The method of claim 1, wherein:
    at least one of the metrics associated with each of the at least one CPE includes a ratio of a first health indicator value to a second health indicator value for the CPE;
    wherein the first health indicator value corresponds to a number of time intervals that the health indicator value for the CPE is greater than a predetermined threshold value; and
    the second health indicator value corresponds to a number of time intervals that the selected health indicator value for the CPE is less than the predetermined threshold value.

9. The method of claim 1, wherein the determining the second of results further comprises:
    training a model by applying the at least one machine learning algorithm to a set of metrics associated with previously collected data related to connectivity for the at least one CPE; and
    applying the trained model to the at least one second portion of the generated set of metrics.

10. The method of claim 9, wherein the at least one machine learning algorithm is an unsupervised machine learning algorithm.

11. The method of claim 1, wherein the at least one machine learning algorithm comprises one or more of K nearest neighbors, support vector machine, artificial neural network, and random forest.

12. The method of claim 1, wherein the generating the information indicative of the potential compatibility issues includes combining the first set of results with the second set of results using an inner join function.

13. The method of claim 1, wherein the information indicative of the potential compatibility issues includes at least one of a listing of all CPEs and at least one of compatibility score, configuration recommendations for specific terminals, configuration information for specific CPEs, and recommendations for compatible CPEs.

14. A system comprising:
    a gateway of a satellite network;
    a terminal configured to establish a communication link with the gateway via at least one satellite; and
    at least one customer premise equipment (CPE) connected to the terminal,
    wherein the terminal is configured to facilitate network connectivity for the at the least one CPE over the satellite network via the terminal, and
    wherein the gateway is configured to:
        collect data associated with each of the at least one CPE during a respective interval, the data being related to connectivity of the CPE for performing data communications over the satellite network via the terminal,
        generate a set of metrics associated with each of the at least one CPE by evaluating the data collected during the respective interval based on criteria associated with compatibility of the CPE for the data communications over the satellite network via the terminal,
        determine a first set of results by applying at least one statistical method to at least a first portion of the generated set of metrics for the interval, wherein the first set of results indicates whether one or more CPEs or groups of similar CPEs exhibit potential compatibility issues for the data communications over the satellite network via the terminal, determine a second set of results by applying at least one machine learning algorithm to at least a second portion of the generated set of metrics for the interval, wherein the second set of results indicates whether the one or more CPEs or groups of similar CPEs exhibit the potential compatibility issues for the data communications over the satellite network via the terminal, and generate information indicative of the potential compatibility issues based on the first set of results and the second set of results.

15. The system of claim 14, wherein the data related to connectivity for each CPE includes data providing identification information for the CPE.

16. The system of claim 15, wherein the gateway generates the set of metrics by aggregating the CPE into one or more groups of similar CPEs using the identification information.

17. The system of claim 14, wherein the data associated with each of the at least one CPE includes data associated with a set of operating parameters for each the at least one CPE, the set of operating parameters including at least one of connectivity type, delay, jitter, congestion, packets transmitted, packets sent, packets received, packet loss, and signal strength.

18. The system of claim 14, wherein the gateway generates the set of metrics by computing values for a set of performance characteristics for each CPE based on the collected data associated with each of the at least one CPE, and using the computed values in place of at least some of the collected data for the generation of the set of metrics.

19. The system of claim 14, wherein the gateway determines the second set of results by:

training a model by applying the at least one machine learning algorithm to a set of metrics associated with previously collected data related to connectivity for the at least one CPE; and applying the trained model to the at least one second portion of the generated set of metrics.

20. The system of claim 14, wherein the gateway generates the information indicative of the potential compatibility issues by combining the first set of results with the second set of results using an inner join function.

* * * * *